(No Model.)
T. MORRIS.
EXTENSION BRACKET.
No. 476,892. Patented June 14, 1892.
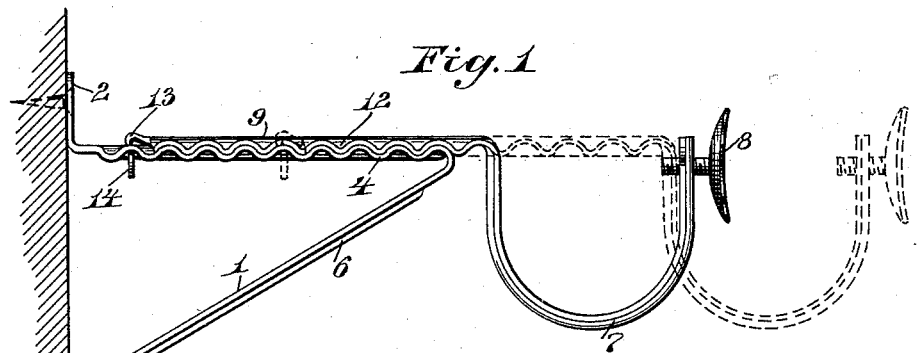
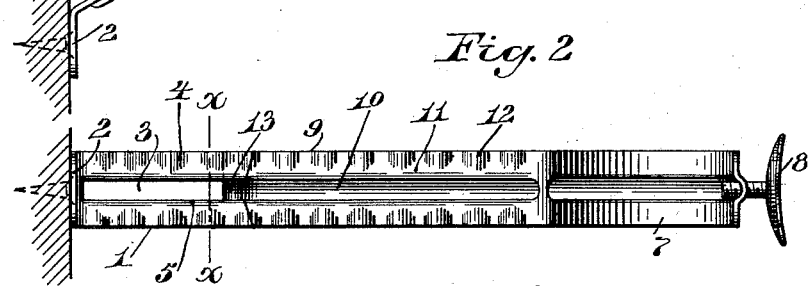
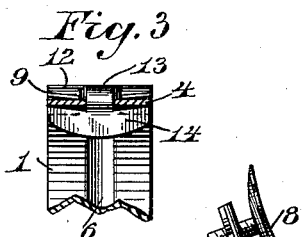
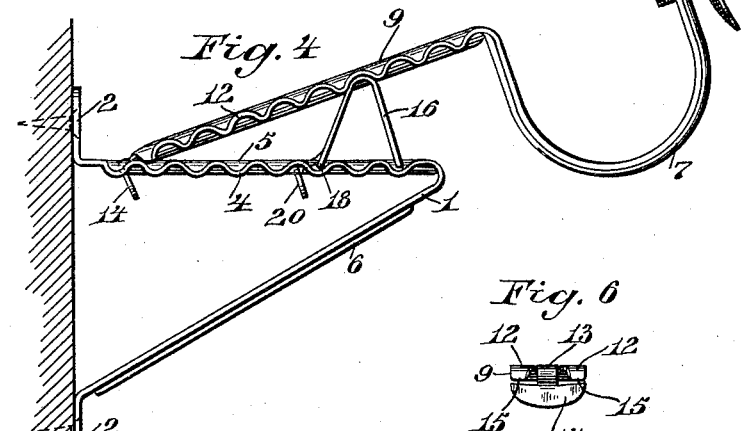
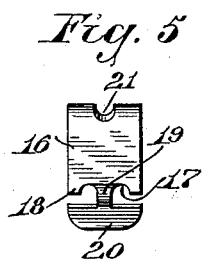
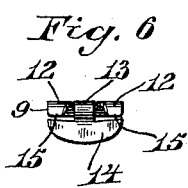
WITNESSES
C. M. Gallaher.
Edith G. Ely.
INVENTOR
Thomas Morris
By A. M. Wooster
Atty.

UNITED STATES PATENT OFFICE.

THOMAS MORRIS, OF BROOKLYN, ASSIGNOR TO JULIUS BERBECKER & CO., OF NEW YORK, N. Y.

EXTENSION-BRACKET.

SPECIFICATION forming part of Letters Patent No. 476,892, dated June 14, 1892.

Application filed October 12, 1891. Serial No. 408,403. (No model.)

*To all whom it may concern:*

Be it known that I, THOMAS MORRIS, a citizen of the United States, residing at Brooklyn, in the county of Kings and State of New York, have invented certain new and useful Improvements in Extension-Brackets; and I do hereby declare the following to be a full, clear, and exact description of the invention, such as will enable others skilled in the art to which it appertains to make and use the same.

My invention has for its object to provide a simple and inexpensive bracket for curtain-poles and similar uses which shall be constructed entirely of sheet metal and which shall be capable of being readily extended or the carrying-loop raised vertically, or, if preferred, the carrying-loop may be moved outward away from the casing and also elevated in the vertical plane. With these ends in view I have devised the simple and novel bracket which I will now describe, referring by numbers to the accompanying drawings, forming part of this specification, in which—

Figure 1 is a side elevation of my novel bracket in operative position, the extended position of the holding-loop being indicated by dotted lines; Fig. 2, a plan view corresponding therewith; Fig. 3, a section on the line $x\ x$ in Fig. 1, looking toward the right; Fig. 4, a view corresponding with Fig. 1, showing the manner in which the holding-loop is elevated; Fig. 5, a rear view of the adjustable support detached; and Fig. 6 is a view of the rear end of the carrying-piece.

1 denotes the bracket proper, which is provided with the usual ears 2, by which it is attached in place. The upper arm of the bracket—i. e., the horizontal arm—is provided with a slot 3 and with corrugations 4 on opposite sides of the slot, there being preferably straight ribs or splines 5 of metal between the slot and the corrugations. The lower arm of the bracket is ordinarily provided with one or more ribs or corrugations 6 for the purpose of strengthening and stiffening it.

In use the pole is held by a loop 7 and is ordinarily locked in place by a set-screw 8. This holding-loop is at the outer end of a carrying-piece 9. The carrying-piece is provided with a depressed central rib or spline 10, which is adapted to engage slot 3, or, if said slot is not carried out to the end of the upper arm of the bracket, to engage a groove (not shown) formed in said upper arm to receive it. On each side of the groove is a raised rib or spline 11, which fits closely over the corresponding rib or spline 5 on the upper arm of the bracket, and on the outer sides of the ribs or splines are corrugations 12, which correspond with and engage corrugations 4 on the bracket. At the inner end of the carrying-piece is a tongue 13, the end of which is downwardly turned and is provided with a cross-piece 14. The tongue is of just suitable size to slide freely in the slot. The cross-piece, however, is preferably made the entire width of the carrying-piece, the outer end thereof being adapted to engage between opposite corrugations 4 on the bracket.

The parts are assembled either before or after the attachment of the bracket in place by turning the carrying-piece at right angles to the bracket, which of course places cross-piece 14 longitudinally with the slot, so that said cross-piece can be passed downward through the slot. The carrying-piece is then tilted sufficiently to place tongue 13 in the slot. The carrying-piece is then turned until it is parallel with and directly over the upper arm of the bracket. As soon as the carrying-piece is dropped down the corrugations 12 will register with corrugations 4, thereby locking it securely in position. Should it be necessary at any time to extend or contract the bracket, the holding-loop may be moved in or out readily by tilting the carrying-piece substantially as in Fig. 4, thus disengaging the corrugations and permitting the bearings 15 at the end of the carrying-piece to ride freely on the ribs or splines. In order that I may be enabled to adjust the carrying-loop in the vertical plane and retain it at any required elevated position—as, for instance, when it is necessary to attach the bracket to a window-casing, but desirable that the pole should be wholly above the casing—I provide an adjustable support 16 for the carrying-piece. (See Fig. 5 in connection with Fig. 4.) This support may be of any suitable shape. I preferably, however, make it substantially in the shape of an inverted V, as shown. Both ends of the support are provided with grooves 17, which receive the ribs or splines 5, and with projections 18, which engage between the corrugations. At one end of the adjustable support is a tongue 19, at the lower end of which is a cross-piece 20. This tongue and cross-piece are made substantially the same as the tongue and cross-piece on the carrying-piece. When it is required to use the adjustable support, the carrying-piece is either tilted, as in Fig. 4, or removed, and the adjustable support is placed in position by first turning it at right angles to slot 3, placing the cross-piece through the slot, and then turning it longitudinal to the bracket, leaving the cross-piece on the under side of the arm of the bracket and the tongue in engagement with the slot. The sets of projections 18 at the opposite ends of the adjustable support will then be in engagement with certain of the corrugations, as shown in Fig. 4, which will retain the support firmly in position. The support may be moved in and out on the bracket by tilting the forward end thereof so that the rear projections 18 will bear on the ribs or splines 5 and sliding it forward and back in the same manner that the carrying-piece is adjusted. The top of the adjustable support is shown as provided with a groove 21 to receive depressed rib or spline 10 on the carrying-piece, thereby holding the latter central and rigidly in place when in the raised position.

The raised position of the carrying-piece will be clearly understood from Fig. 4. It will be seen that the corrugations in the upper arm of the bracket act to hold the inner end of the carrying-piece and the adjustable support in position and that the corrugations in the carrying-piece engage the top of the adjustable support on opposite sides of groove 21, thereby locking the parts firmly in position until disengaged by tilting the carrying-piece and disengaging it from the adjustable support.

Having thus described my invention, I claim—

1. The combination, with a sheet-metal bracket having a longitudinal slot and corrugations on opposite sides thereof, of a carrying-piece having corrugations corresponding with those upon the bracket by which the carrying-piece is locked after adjustment and at its inner end a tongue and cross-piece, said tongue being adapted to engage the slot and the cross-piece to lie on the under side thereof, substantially as described.

2. The combination, with the bracket having a central slot and corrugations on opposite sides thereof, of a carrying-piece having a holding-loop at its outer end, a depressed rib corresponding with the slot in the bracket, and at its inner end a tongue adapted to slide freely in the slot, and a cross-piece adapted to engage the bracket on the under side, thereby locking the carrying-piece to the bracket.

3. A bracket having a longitudinal slot, on opposite sides of said slot ribs 5, and on the outer sides of the ribs corrugations, in combination with a carrying-piece having a depressed rib corresponding with the slot, raised ribs corresponding with the ribs on the bracket, bearings 15, adapted to ride over ribs 5 when the carrying-piece is tilted, a tongue adapted to engage the groove, and a cross-piece at the end of the tongue which is adapted to be passed through the groove and then turned crosswise to the bracket, whereby the carrying-piece is held in position.

4. The combination, with a bracket having a central slot and corrugations on opposite sides thereof, of a carrying-piece having corrugations corresponding therewith and at its inner end a tongue and cross-piece, substantially as described, and an adjustable support, the lower ends of which are adapted to engage corrugations upon the bracket and the upper end to engage corrugations upon the carrying-piece, whereby the latter may be held at a raised position.

5. A bracket having a central slot and corrugations on opposite sides thereof, in combination with a carrying-piece having corresponding corrugations, a tongue adapted to engage the slot, and at the end of the tongue a cross-piece adapted to engage the bracket to hold the carrying-piece in position, and an adjustable support having a similar tongue and cross-piece, whereby it is retained in position, the top of said support being adapted to engage corrugations in the carrying-piece and the bottom to engage corrugations in the bracket, whereby all of said parts are held in operative position until the carrying-piece is tilted.

6. A bracket having a central slot, ribs on opposite sides of the slot, and corrugations outside of the ribs, in combination with a carrying-piece having similar corrugations, a depressed rib to engage the slot, raised ribs to engage the ribs on the bracket, bearings 15, which engage the ribs on the bracket when the carrying-piece is tilted, and a tongue and cross-piece, for the purpose set forth, and an adjustable support having a similar tongue and cross-piece, projections 18, which engage corrugations in the bracket, and a groove 21 to receive the depressed rib in the carrying-piece.

In testimony whereof I affix my signature in presence of two witnesses.

THOMAS MORRIS.

Witnesses:
ADAM WENDEL,
J. J. HENDERSON.